(12) United States Patent
Desroche

(10) Patent No.: US 7,063,289 B2
(45) Date of Patent: Jun. 20, 2006

(54) HELICOPTER TAIL SECTION

(75) Inventor: Robert J. Desroche, 9730 29th Ave., West Hang C-106, Everett, WA (US) 98204

(73) Assignee: Robert J. Desroche, Everett, WA (US)

( * ) Notice: Subject to any disclaimer, the term of this patent is extended or adjusted under 35 U.S.C. 154(b) by 0 days.

(21) Appl. No.: 10/954,035

(22) Filed: Sep. 28, 2004

(65) Prior Publication Data

US 2005/0279879 A1    Dec. 22, 2005

Related U.S. Application Data

(62) Division of application No. 10/799,508, filed on Mar. 11, 2004, now Pat. No. 6,869,045.

(51) Int. Cl.
*B64C 27/00* (2006.01)

(52) U.S. Cl. ............................. 244/17.11; 244/17.19; 244/130

(58) Field of Classification Search ............ 244/17.11, 244/17.19, 87, 130; 29/897.2, 897; D12/327
See application file for complete search history.

(56) References Cited

U.S. PATENT DOCUMENTS

| 2,626,766 | A | * | 1/1953 | McDonald | 244/17.11 |
| 3,966,145 | A | * | 6/1976 | Wiesner | 244/17.11 |
| D425,853 | S | * | 5/2000 | Caporaletti | D12/327 |

OTHER PUBLICATIONS http://www.scalehelis.com/flyin/vert/vert12.jpg with http://www.scalehelis.com/flyin/vert/vert.html.*

* cited by examiner

*Primary Examiner*—Jeffrey L. Gellner
*Assistant Examiner*—Timothy D. Collins
(74) *Attorney, Agent, or Firm*—Delbert J. Barnard

(57) ABSTRACT

A vertical stabilizer (38) is supported by and projects upwardly and rearwardly from the tail portion (14) of a helicopter fuselage (12). A tail rotor (TSR) is mounted on the vertical stabilizer (38) for rotation about a horizontal axis (C). The tail rotor (TSR) is positioned laterally outwardly from one side of the vertical stabilizer (38). The vertical stabilizer (38) has an upper end, a lower end and a rear edge recess (44) located between the upper end and the lower end. The recess (44) has a laterally convex rear edge (50). The tail portion (14) of fuselage (12) has a rear end extension (40) that extends rearwardly from the vertical stabilizer (38) and narrows in width as it extends rearwardly. The rear end extension (40) of the fuselage (12) provides vertical area to replace vertical area that was removed by placement of the recess (44) in the vertical stabilizer (38). A corner (82) is formed where the rear edge of the vertical stabilizer (50) meets the upper edge (80) of the rear end extension (40) of the fuselage (12). The corner (82) is laterally convex and vertically concave. The upper end of the vertical stabilizer (38) is wider than the vertical stabilizer is in the region of the rear edge recess (44). The upper end of the vertical stabilizer (38) forms a corner (84) with the rear edge recess (44). This corner (84) is laterally convex and vertically concave. The rear end extension (40) of the tail portion (14) of the fuselage (12) has a forward portion including sides that are convex in the vertical direction and a rear end portion that is substantially straight in the vertical direction. The rear end extension (40) of the tail section (14) of the fuselage (12) is both laterally and longitudinally convex.

11 Claims, 4 Drawing Sheets

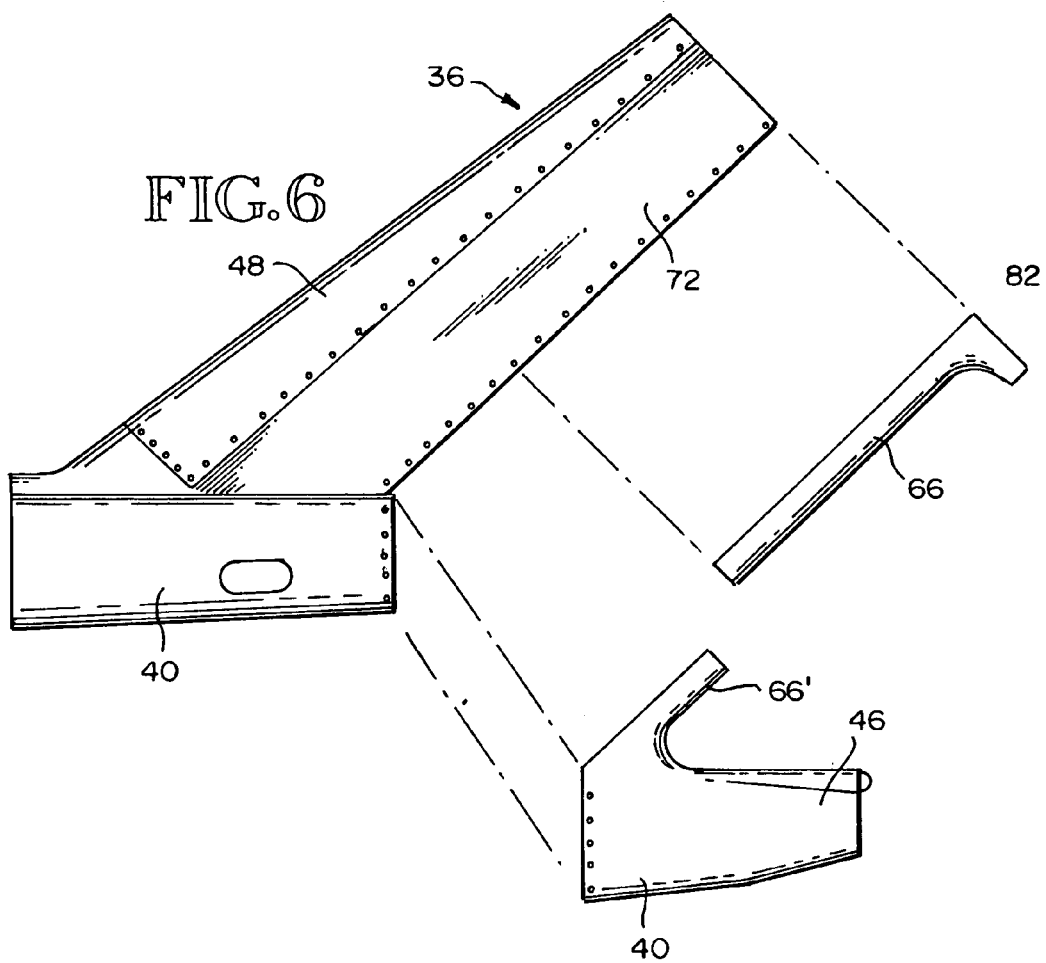
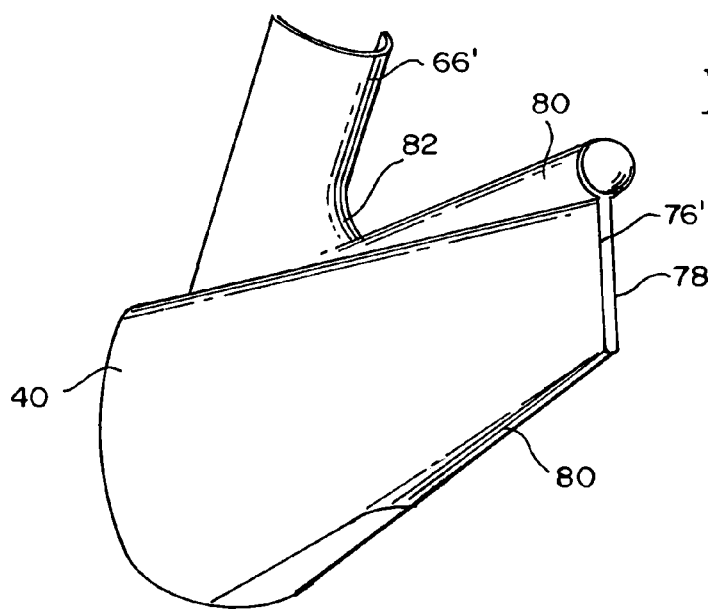

HELICOPTER TAIL SECTION

RELATED APPLICATION

This application is a division of Ser. No. 10/799,508, filed Mar. 11, 2004 now U.S. Pat. No. 6,869,045, and entitled, "Helicopter Tail Section and Retrofit Method."

TECHNICAL FIELD

This invention relates to a helicopter having a tail portion, a vertical stabilizer supported by and projecting upwardly and rearwardly from the tail portion, and a tail rotor mounted on one side of the vertical stabilizer for rotation about a horizontal axis. More particularly, it relates to a construction of the tail portion and the vertical stabilizer that reduces aerodynamic load and stress and wear on the tail portion of the helicopter.

BACKGROUND OF THE INVENTION

In single rotor helicopters, a lifting force and a propulsive force are provided by a main lifting rotor and yaw control is provided by a second, smaller rotor mounted on a vertical stabilizer at the rear or fail of the fuselage. This second rotor, herein the "tail rotor", is positioned laterally outwardly from one side of the vertical stabilizer and is mounted at the upper end of the vertical stabilizer for rotation about a horizontal axis. Rotation of the tail rotor causes the rotor to generate a sideways airstream. The vertical stabilizer is in this airstream and blocks a significant portion of the airflow. The blockage effect of a conventional vertical stabilizer is detrimental to the function and efficiency of the helicopter. There is a need to reduce the airstream blockage by the vertical stabilizer. A primary object of the present invention is to fulfill this need, both as a retrofit and as a new construction.

A typical helicopter configuration to which the present invention applies is disclosed by U.S. Design Pat. No. D278,227, granted Apr. 2, 1985, to George W. Johnston, Jr., and assigned to Bell Helicopter Textron, Inc.

BRIEF SUMMARY OF THE INVENTION

A conventional helicopter is characterized by a fuselage having a tail portion and a vertical stabilizer supported by and projecting upwardly and rearwardly from the tail portion. A tail rotor is positioned on one side of the vertical stabilizer and is mounted onto the upper end of the vertical stabilizer for rotation about a horizontal axis. According to an aspect of the invention, the vertical stabilizer has an upper end, a lower end, a laterally convex forward edge and a rear edge recess located between the upper and the lower end, said rear edge recess having a laterally convex rear edge.

According to another aspect of the invention, the tail portion of the fuselage has a rear end extension that extends rearwardly from the vertical stabilizer and narrows in width as it extends rearwardly. The real end extension of the fuselage provides vertical area to replace vertical area that is removed by providing the recess in the vertical stabilizer.

Preferably, the rear end extension of the tail portion of the fuselage has a laterally convex upper edge and a laterally convex lower edge. A corner is formed where the rear edge of the vertical stabilizer meets the upper edge of the rear end extension of the fuselage. This corner is laterally convex and vertically concave.

Preferably, the upper end of the vertical stabilizer is wider than the vertical stabilizer is in the region of the rear edge recess. The upper end of the vertical stabilizer forms a corner with the rear edge recess. This corner is laterally convex and vertically concave.

The rear end extension of the tail of the fuselage may have a forward portion that has sides that are convex in the vertical direction and rear end portion that is substantially straight in the vertical direction.

An object of the present invention is to improve the flying qualities of the helicopter. The working of the tail section of the helicopter is reduced, solving or lessening fatigue problems. The power requirements of the tail rotor are reduced, resulting in more power being available for operation of the main rotor.

Other objects, advantages and features of the invention will become apparent from the description of the best mode set forth below, from the drawings, from the claims and from the principles that are embodied in the specific structures and steps that are illustrated and described.

BRIEF DESCRIPTION OF THE SEVERAL VIEWS OF THE DRAWING

Like reference numerals used to designate like parts throughout the several views of the drawing, and:

FIG. 6 is an exploded side elevational view of the tail structure component shown by FIG. 3;

FIG. 7 is a pictorial view taken from below and looking towards the bottom, one side and rear end of the rear end extension of the fuselage.

DETAILED DESCRIPTION OF A PREFERRED EMBODIMENT

Figures 1, 2:
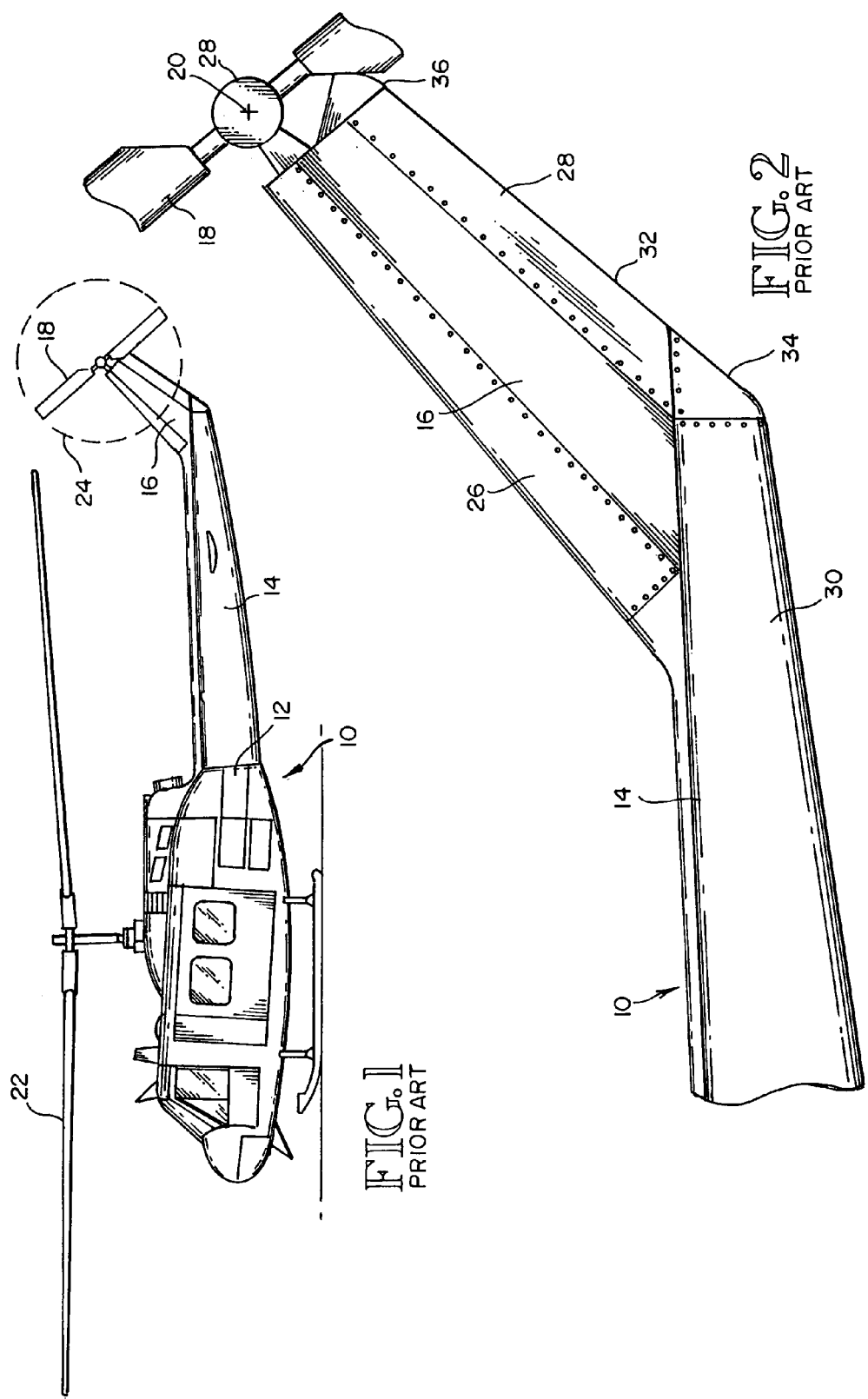
FIG. 1 is a side elevational view of a prior art helicopter comprising a fuselage having a forward portion and a tail portion, a main rotor carried by and positioned above the forward portion, and a tail structure mounted tail rotor.
FIG. 2 is an enlarged scale view of the real portion of FIG. 1, with portions of the tail rotor blades cut away.

FIGS. 1 and 2 show a prior art helicopter 10, characterized by a fuselage 12 having a tail section 14 and a vertical stabilizer 16 mounted on and extending upwardly and rearwardly from the tail section 14. A tail rotor 18 is mounted for rotation about a horizontal axis 20 at or above the upper end of the rear stabilizer 16. A main rotor 22 is mounted on the fuselage 12 near the front of the helicopter. This helicopter is generally like the helicopter disclosed by the aforementioned U.S. Design Pat. No. D278,227.

In FIG. 1, the fly diameter of the tail rotor 18 is designated 24. It defines the outline of a sideways airstream that is created by the tail rotor 18. The side location and direction of rotation of the tail section rotor TSR is a variable. It can be placed on either the left or the right side of the tail section 38. Also, it may rotate forwardly or rearwardly. It may push the airstream into the vertical stabilizer 38 or pull it into the vertical stabilizer 38.

FIG. 1 shows that a substantial portion of the vertical stabilizer is located in this airstream where it blocks air flow. The blockage causes fatigue working of the tail section parts and requires more power to operate the tail rotor 18. The vertical stabilizer 16 has an airfoil cross-sectional shape. Its forward edge 26 is relatively rounded and wide and its after edge portion 28 tapers and is generally V-shaped. A drive shaft for the tail rotor 18 extends through the vertical stabilizer 16 to a gear that drives a complementary gear that is a part of the hub 28 of the rear rotor 18. The rear of tail portion 30 of the fuselage merges into the lower end portion of the vertical stabilizer 16. A lower edge 32 extends from bottom region 34 on the tail portion 30 up to region 36 at the upper end of vertical stabilizer 16.

Figure 3:
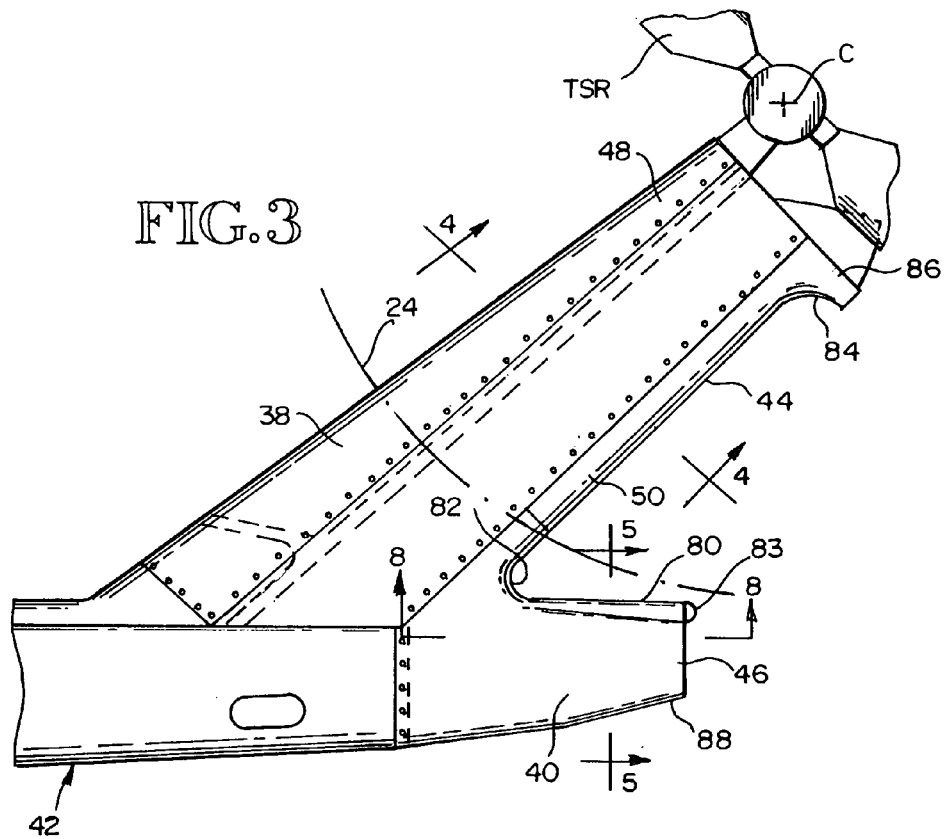
FIG. 3 is a view like FIG. 2 but showing an embodiment of the present invention, characterized by a rear edge recess in the vertical stabilizer and a rearward extension of the tail portion of the fuselage.
Figure 4:
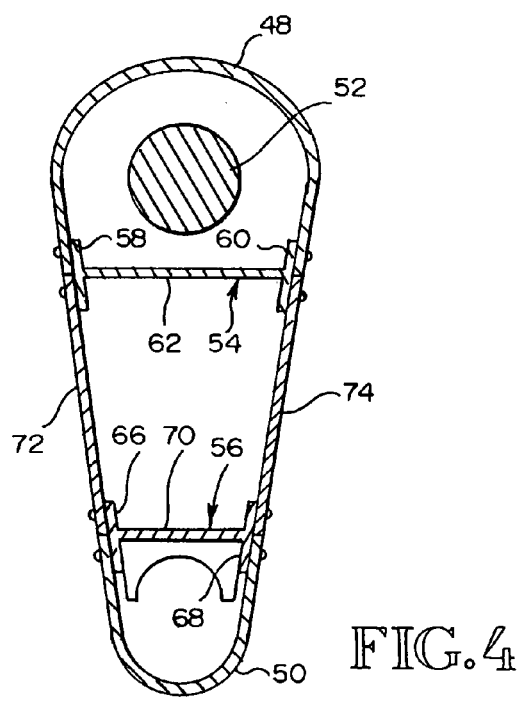
FIG. 4 is a cross sectional view taken through the vertical stabilizer substantially along line 4—4 of FIG. 3.

In the embodiment of the invention shown by FIGS. 3–8 of the drawing, there are significant differences in the construction of the vertical stabilizer 38 and the tail portion 40 of the fuselage 42. The vertical stabilizer 38 is provided with a rear edge recess 44. At its lower end, the recess 44 intersects a rear extension 46 of the tail portion 40 of the fuselage 42. As shown by FIG. 4, the tail section 38 has a laterally convex forward edge 48 and the recess 44 has a laterally convex rear edge 50. The curvature of the edge portions 48, 50 are at least generally circular. The air flow from tail section rotor TSR moves against the vertical stabilizer 38 and divides and flows around the convex surfaces 48, 50. This shape of the edges 48, 50, and the narrower width of the vertical stabilizer 38, reduces the blockage caused by the airstream on the vertical stabilizer 38.

A power shaft 52 extends lengthwise of the vertical stabilizer 38 and is drivenly connected at its rearward end to the hub portion of the tail section rotor TSR. As shown by FIG. 4, longitudinal beams 54, 56 extend lengthwise of the vertical stabilizer 38. Beam 54 is shown to comprise a pair of side flanges 58, 60 and an interconnecting web 62. Forward edge section 64 of the vertical stabilizer is shown to be connected to the flanges 58, 60, by the use of suitable fasteners. The beam 56 is shown to comprise a pair of flanges 66, 68 and the interconnecting web 70. The convex edge portion 50 is shown to be connected to the flanges 66, 68. Side panels 72, 74 are shown to be connected to both the flanges 58, 60 and the flanges 66, 68 also by suitable connectors. As clearly shown by FIG. 4, the convex edge region 48 and the convex edge region 50 have substantially a circular curvature. The side panels 72, 74 are shown to be substantially flat and diverge rearwardly.

Figure 5:
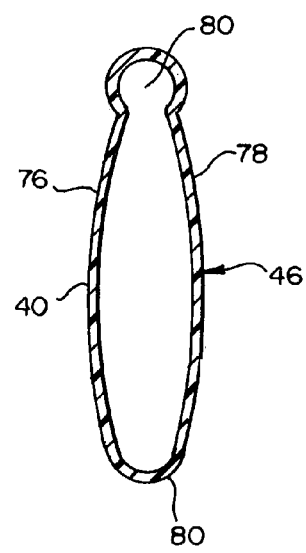
FIG. 5 is a cross sectional view of the rear extension of the rear end portion of the fuselage, taken substantially along line 5—5 of FIG. 3.
Figure 8:
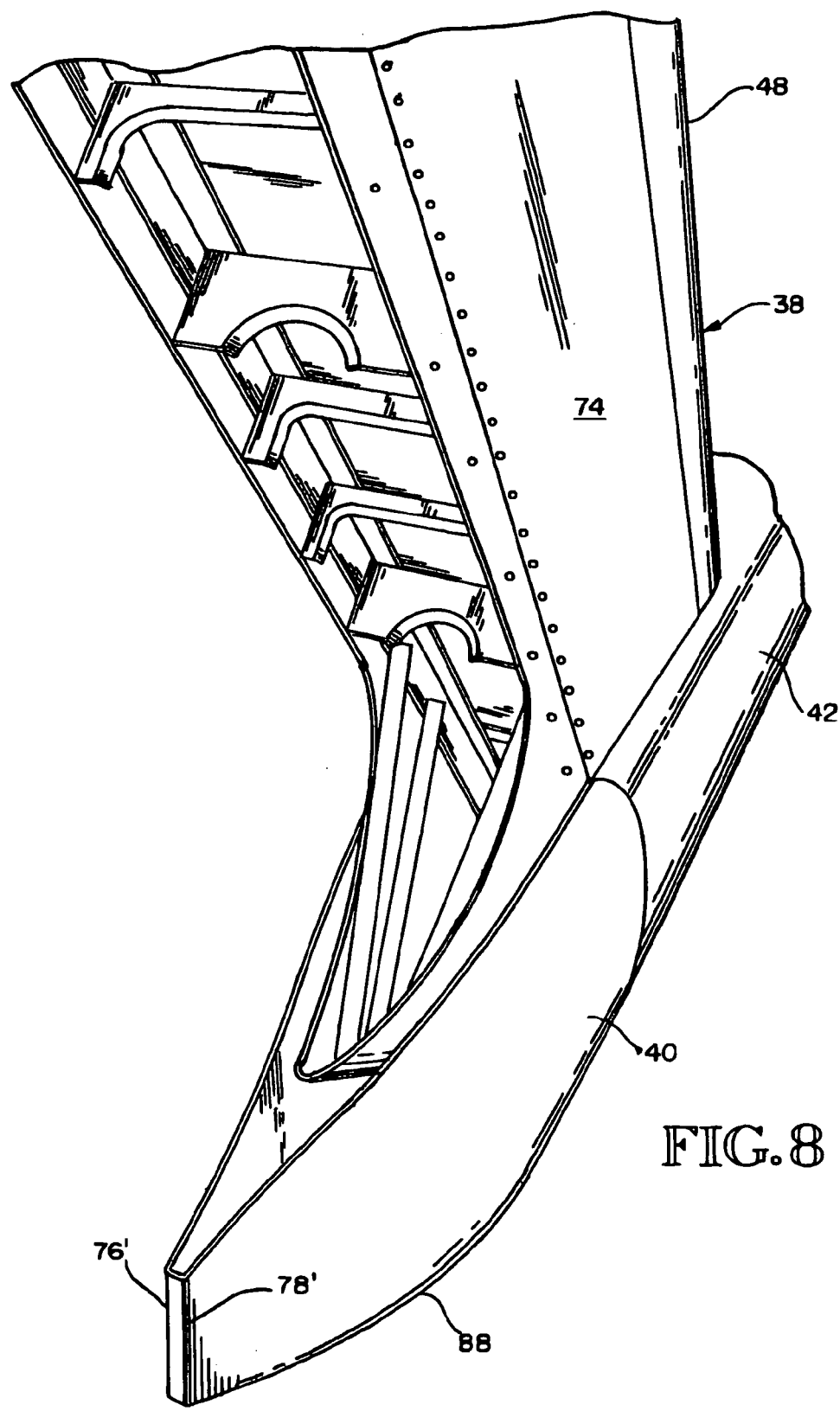
FIG. 8 is a pictorial view of FIG. 6, looking towards one side and the rear end of the stabilizer, but with the member that forms the rear edge portion of the vertical stabilizer and the top portion of the rear extension of the fuselage omitted.

Referring to FIG. 5, the rear end extension 46 of the tail section 40 preferably tapers rearwardly to a region shown in FIG. 5 where the side members 76, 78 have a vertically convex curvature. The extension 46 then changes shape as it extends further rearwardly and at its rear end the sides 96', 78' are substantially vertically straight. The upper end portion 80 of the rear end extension 46 may have a substantially tubular shape. A tail light 83 (FIG. 3) may be provided at the rear end of the portion 80. As Shown by FIG. 6, the convex region 48 may be a single member. The region 66, including its upper end region 82, may be a single member. Regions 46, 66' may be a single member.

Referring back to FIG. 3, the laterally convex lower edge of the vertical stabilizer 38 makes a corner where it joins the upper convex edge 80 of the rear end extension 46. This corner is laterally convex and vertically concave. A similar corner 84 is defined where the laterally convex lower edge of the vertical stabilizer meets the upper end portion 86 of the vertical stabilizer 38. As shown by FIG. 3, the rear end extension 46 has a lower edge that is both laterally and longitudinally convex.

The tail section revision of the present invention is suitable for either a new manufacture or a retrofit of an existing helicopter. For example, referring to FIG. 2, vertical stabilizer portion 28 and fuselage portions 28, 34 may be removed from the prior art helicopter and replaced by elements 66, 82 and 40, 46, 66' shown in FIG. 6. Preferably, elements 66, 82 and 40, 46, 66' are constructed from a composite material. They may be molded by suitable molding equipment that is and has been used for molding composite aircraft parts. Parts or portion 28, 34 may not be defined parts. Rather, they may be sections that are cut off from the parts 16, 30 by any suitable cutting implement. Nut plates fasteners may be used for securing parts 66, 82 and 40, 46, 66' to parts 40 and 72.

The illustrated embodiment represents a single example of the present invention and, therefore, is non-limitive. It is to be understood that many changes in the particular structure, materials, and features of the invention may be made without departing from the spirit and scope of the invention. Therefore, my patent rights are not to be limited by the particular embodiment that is illustrated and described herein, but rather is be determined by the following claims, interpreted according to accepted doctrines of patent claim interpretation, including use of the doctrine of equivalents.

What claimed is:

1. A helicopter, comprising:
    a fuselage having a tail portion and a vertical stabilizer supported by and projecting upwardly and rearwardly from the tail portion;
    a power shaft extending longitudinally through said vertical stabilizer and having an upper end above the vertical stabilizer,
    a tail rotor mounted on the upper end of the power shaft for rotation about a horizontal axis, said tail rotor being positioned laterally outwardly from one side of the vertical stabilizer;
    said vertical stabilizer having an upper end, a lower end and a rear edge recess located between the upper end and the lower end, said recess having a laterally convex rear edge; and
    said tail portion of the fuselage having a rear end extension that extends rearwardly from the vertical stabilizer below said rear edge recess and narrows in width as it extends rearwardly, said rear end extension of the fuselage providing vertical area to replace vertical area removed by the recess in the vertical stabilizer.

2. The helicopter of claim 1, wherein the rear end extension of the tail portion of the fuselage has a laterally convex upper edge and a laterally convex lower edge.

3. The helicopter of claim 2, wherein a corner is formed where the rear edge of the vertical stabilizer meets the upper edge of the rear end extension of the fuselage, and said corner is laterally convex and vertically concave.

4. The helicopter of claim 1, wherein the upper end of the vertical stabilizer is wider than the vertical stabilizer is in the region of the rear edge recess, and the upper end of the vertical stabilizer forms a corner with the rear edge recess, said corner being laterally convex and vertically concave.

5. The helicopter of claim 1, wherein the rear end extension of the tail portion of the fuselage has a forward position including sides that are convex in the vertical direction and a rear end portion that is substantially straight in the vertical direction.

6. A helicopter, comprising:
a fuselage having a tail portion and a vertical stabilizer supported by and projecting upwardly and rearwardly from the tail portion;
a power shaft extending longitudinally through said vertical stabilizer and having an upper end above the vertical stabilizer;
a tail rotor mounted on the upper end of the power shaft for rotation about a horizontal axis, said tail rotor being positioned laterally outwardly from one side of the vertical stabilizer; and
said vertical stabilizer having an upper end, a lower end, a laterally convex forward edge, and a rear edge recess located between the upper end and the lower end, said rear edge recess having a laterally convex rear edge.

7. The helicopter of claim 6, wherein the upper end of the vertical stabilizer is wider than the vertical stabilizer is in the region of the rear edge recess, and the upper end of the vertical stabilizer forms a corner with the rear edge recess, said corner being laterally convex and vertically concave.

8. The helicopter of claim 6, wherein said trail portion of the fuselage has a rear end extension that extends rearwardly from the vertical stabilizer and narrows in width as it extends rearwardly.

9. The helicopter of claim 8, wherein the rear end extension of the tail portion of the fuselage has a laterally convex upper edge and a laterally convex lower edge.

10. The helicopter of claim 9, wherein a corner is formed where the rearedge of the vertical stabilizer meets the upper edge of the rear end extension of the fuselage, and said corner is laterally convex and vertically concave.

11. The helicopter of claim 8, wherein the rear end extension of the tail portion of the fuselage has a forward portion that has sides that are convex in the vertical direction and a rear end portion that is substantially straight in the vertical direction.

* * * * *